(12) United States Patent
David

(10) Patent No.: US 11,046,478 B2
(45) Date of Patent: Jun. 29, 2021

(54) MIXING-BOWL ASSEMBLY

(71) Applicant: ANAMINA PLUS S.R.L., Balotesti Commune (RO)

(72) Inventor: Carmen Bianca David, Bucharest (RO)

(73) Assignee: ANAMINA PLUS S.R.L., Balotesti Commune (RO)

( * ) Notice: Subject to any disclaimer, the term of this patent is extended or adjusted under 35 U.S.C. 154(b) by 61 days.

(21) Appl. No.: 16/416,217

(22) Filed: May 18, 2019

(65) Prior Publication Data

US 2019/0375540 A1     Dec. 12, 2019

(30) Foreign Application Priority Data

Jun. 12, 2018   (RO) ............................... u 2018 00030

(51) Int. Cl.
  *B65D 8/00*     (2006.01)
  *B65D 43/02*    (2006.01)
  *A47J 47/02*    (2006.01)

(52) U.S. Cl.
  CPC ............... *B65D 11/02* (2013.01); *A47J 47/02* (2013.01); *B65D 43/0204* (2013.01)

(58) Field of Classification Search
  CPC ............ B65D 11/1866; B65D 11/1873; B65D 11/1893; B65D 11/02; B65D 11/00; B65D 11/105; B65D 81/3813; B65D 81/3346; B65D 81/343; B65D 81/365; B65D 81/32; B65D 43/0204; B65D 43/02; B65D 43/00;

(Continued)

(56) References Cited

U.S. PATENT DOCUMENTS

| 133,518 A | * | 12/1872 | Burnap | B65D 41/06 215/332 |
| 3,606,074 A | * | 9/1971 | Hayes | B65D 25/24 220/212 |

(Continued)

FOREIGN PATENT DOCUMENTS

| DE | 9201599 U1 | 4/1992 | |
| WO | WO-2015153953 A1 | * 10/2015 | ............. A47G 19/23 |
| WO | WO-2017217982 A1 | * 12/2017 | ............. B32B 27/10 |

OTHER PUBLICATIONS

English machine translation of description and claims of DE 9201599 U1 (Apr. 23, 1992).

(Continued)

*Primary Examiner* — J. Gregory Pickett
*Assistant Examiner* — Abigail Elizabeth Guidry
(74) *Attorney, Agent, or Firm* — Hershkovitz & Associates, PLLC; Abe Hershkovitz

(57) ABSTRACT

A bowl assembly includes a main bowl having a spherical outer surface, a removable median extension having a spherical outer surface and a lid having a protruding grip profile. The main bowl is made of an opaque plastic material in the form of a spherical zone having a silicone sealant applied to a bottom of the main bowl to ensure stability of the bowl assembly during use and which is provided at a top with four "L" shaped grooves. The removable median extension is open at a top and a bottom thereof is attached to the main bowl and is made of transparent plastic. The removable median extension is joined with the main bowl by sliding protrusions and grooves. Positioned above the removable median extension there is the lid which has a grip profile.

4 Claims, 6 Drawing Sheets

(58) Field of Classification Search
CPC ........ B65D 88/46; B65D 25/20; B65D 25/04; B65D 41/0407; B65D 41/04; B65D 55/16; B65D 47/08; B65D 85/60; A47J 47/00–10; A47J 43/0727; A47J 36/00; A47J 27/00; A47J 27/002; A47J 37/101; B44D 3/128; A47G 19/30; A47G 19/02; A47G 11/00; A47G 2400/062; Y02W 90/10; Y02W 90/11; Y02A 40/961

See application file for complete search history.

(56) References Cited

U.S. PATENT DOCUMENTS

| | | | | |
|---|---|---|---|---|
| 4,763,568 | A * | 8/1988 | Kiczek | A23L 7/187 219/400 |
| 5,169,023 | A * | 12/1992 | Heiberg | A47J 47/00 220/574 |
| 5,893,640 | A * | 4/1999 | Myers | A47J 43/0705 366/129 |
| 6,123,449 | A * | 9/2000 | Sadek-Patt | A47J 43/0727 220/731 |
| D552,473 | S * | 10/2007 | Simkin | D9/516 |
| RE48,037 | E * | 6/2020 | Marina | B65D 41/18 D9/454 |
| 2006/0248851 | A1* | 11/2006 | Kishbaugh | A47J 36/027 52/750 |
| 2014/0061328 | A1* | 3/2014 | Haymond | A61L 9/12 239/6 |
| 2014/0099411 | A1* | 4/2014 | Darnell | A23G 3/0063 426/241 |
| 2015/0047511 | A1* | 2/2015 | Mastroianni | A23L 7/183 99/323.5 |
| 2016/0021915 | A1* | 1/2016 | Baxter | B65D 11/02 426/295 |
| 2016/0060004 | A1* | 3/2016 | Dunn | B65D 25/04 222/144.5 |
| 2018/0112337 | A1* | 4/2018 | Sullivan | B65D 25/04 |
| 2018/0237188 | A1* | 8/2018 | Aung | B65D 85/72 |
| 2020/0207535 | A1* | 7/2020 | Bhat | B65D 51/2835 |

OTHER PUBLICATIONS

Search Report in related Romanian Patent Application No. U 2018 00030, dated Nov. 27, 2018.

* cited by examiner

MIXING-BOWL ASSEMBLY

CROSS-REFERENCE TO RELATED APPLICATION

This US Patent application claims priority of Romanian Patent Application No. U 2018 00030 filed Jun. 12, 2018, the disclosure of which is incorporated herein in its entirety by specific reference thereto.

TECHNICAL FIELD

This utility model refers to a spherical bowl assembly having a configuration substantially diminishing the possibility that, during the mechanical processing of food, food drops spread outside the bowl in the working area, this utility model being primarily of interest due to the potential of large-scale use in daily food preparation, both within private households and at an industrial scale as well, within public catering establishments.

TECHNICAL STATE OF THE ART

In the kitchen environment the bowls known to be used essentially comprise a base for the stable vertical positioning of the bowl, a peripheral wall extending outwardly, arched up relative to the base, and a top wall border defining the top hole or mouth of the bowl. The bowl, both inside and outside, has a generally truncated configuration (with the smaller base pointed downwards) that facilitates the mixing of contents inside the bowl allowing the introduction and use of tools such as various types of blenders, mixers, batters or stirrers, to mix the contents.

It is known that in the mechanical cold processing of foods, vessels, pots, and bowls dedicated to their mechanical processing are used (by operating external instruments inside the bowl such as: various types of whisks, blenders, mixers, spoons, etc.).

Kitchen pots or bowls are widely used household items, as their configuration is very simple; they are most often made up of a flat part, the "bowl bottom", and the circular wall of the bowl, which has a certain degree of tilt outward from the vertical plane. Cooking pots or bowls can be made of a wide range of materials (plastic, glass, plexiglass, various types of ceramics, metal, etc.).

One problem with the conventional mixing bowl, the configuration of which ends at a top edge, with smooth, hard inner and outer surfaces defining the mouth of the bowl, is the difficulty of manually gripping the bowl wall. Gripping is usually less satisfactory, especially in the case of processing of foods, since during mixing, they may tend to extend over the upper edge of the bowl and spill along the outside of the container.

US 2016/0021915 A1 discloses a spherical food storage container with a lid. The food container is made of a top portion, a bottom portion, and a lid to form a hollow hemisphere. The three parts are hinged one to another.

U.S. Pat. No. 5,169,023 discloses a mixing bowl of generally arcuate configuration and including laterally spaced stabilizing ribs extending along the outer surface thereof between the base and a mouth-defining rim. The ribs, upon an inclination of the bowl, continuously define a laterally extending support plane. The interior of the bowl is of a hard smooth material while the exterior thereof is of a non-slip friction-enhancing material. The open mouth of the bowl is surrounded by an outwardly flaring rim with a grip-enhancing under-surface.

US 2016/0060004 A1 discloses a dispensing cover having a lid with at least one spout and a spout cover hingedly connected to a base. The base is attached to the lid and has a recess adapted to receive and secure via a friction fit a portion of the spout cover in an open position.

U.S. D552,473 S discloses the ornamental design for a container.

The above-mentioned patents do not provide a solution for protection against food drops spreading outside containers during processing.

One problem with conventional bowls is that during the mixing process, food drops are driven by the centrifugal force and are expelled out of the bowl, dirtying the workspace.

The novelty to the state of the art consists in the configuration of the bowl assembly and the ratios between the dimensional characteristics of its component parts so as to provide protection against the spreading of food outside the container during processing.

The purpose of the utility model is to create a type of bowl that, by its configuration, prevents food drops from flowing out of it during cold mechanical processing of foods. The advantages of the bowl assembly according to the invention result from the shape of the bowl with selected unique characteristics and which are not suggested so far in the state of art.

Description of the Utility Model

The main requirements for bowls (cooking bowls) consider the volume they can accommodate (as bowls may have capacities that vary widely, generally between ~0.250 l, to ~10,000 l), the convenience of handling and, as far as possible, avoiding the soiling of the workspace by the involuntary release of food drops to the outside of the bowl, due to the forces acting on the food during cold mechanical processing.

This latter feature is especially important for families who cook in their own household, for households where food is cooked frequently, or for public catering establishments.

In order to meet these requirements, the solution provided by this utility model is proposed to improve the characteristics of a bowl, a food preparation bowl, so as to obtain a superior level of user satisfaction.

This assembly, resulting from a combination of a conventional bowl—as the basic body of the product can be considered, with the extension of an upper open hemispherical cap which will be applied during food processing, provides the spherical shape of the product which, by its configuration, leads to the elimination of the main inconvenience in the use of cooking bowls, that of food flowing over the edge of the bowl or spreading of food drops from the bowl, this major advantage resulting in increased user comfort and customer satisfaction.

The technical concept of the utility model is to provide a type of cooking bowl assembly of a spherical shape that offers multiple use options, with its main feature being the ability to prevent the spreading of food drops out of the bowl during the mechanical processing of food.

The utility model consists of a spherical bowl made of opaque plastic, with a silicone sealant applied to the external bowl bottom to ensure the stability of the assembly during operation, over which a removable median extension in the form of a spherical area open at its top and bottom is attached, made of transparent plastic. The removable median extension is attached to the main bowl—the base of the assembly, by a known gripping system, by sliding four protrusions positioned diametrically opposed and at equal distances between them, located on the outside of the lower edge of the median extension, in four "L" shaped grooves, profiled on the inside of the top edge of the main bowl, positioned diametrically opposed and at equal distances between them. The removable extension is provided with a plastic lid. The lid has a three-dimensional protruding grip profile resulting from its configuration.

The advantages of this utility model lie in the spherical configuration of the assembly, which prevents the spreading of the work material outside the bowl.

Thus, in addition to the mechanical processing of food in optimal conditions, the bowl assembly can also be used for storing fruit, vegetables, and other foods in optimal conditions to preserve their quality.

Another advantage is the possibility of disassembling the model so that the bowl/pot can be used as any "classic" bowl.

Other features and advantages of the invention will become apparent from the more detailed description of the invention, as follows.

Figure 1:
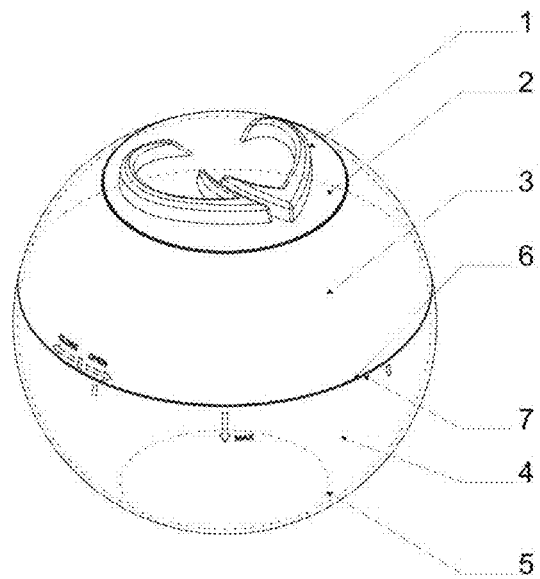
FIG. 1—Represents a perspective view of the assembled bowl assembly.
Figure 2:
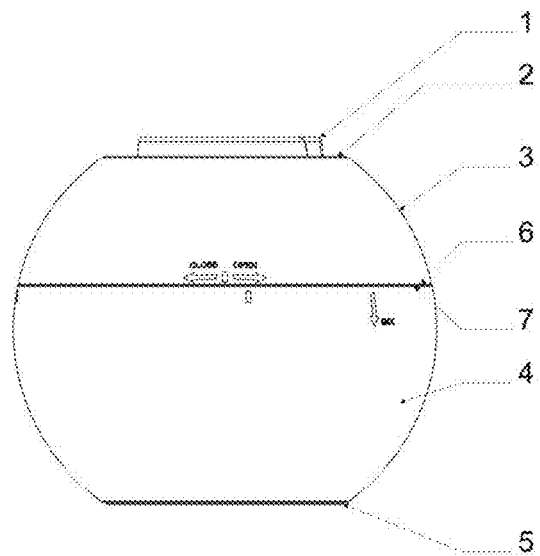
FIG. 2—Represents a front view of the assembled bowl assembly.
Figure 3:
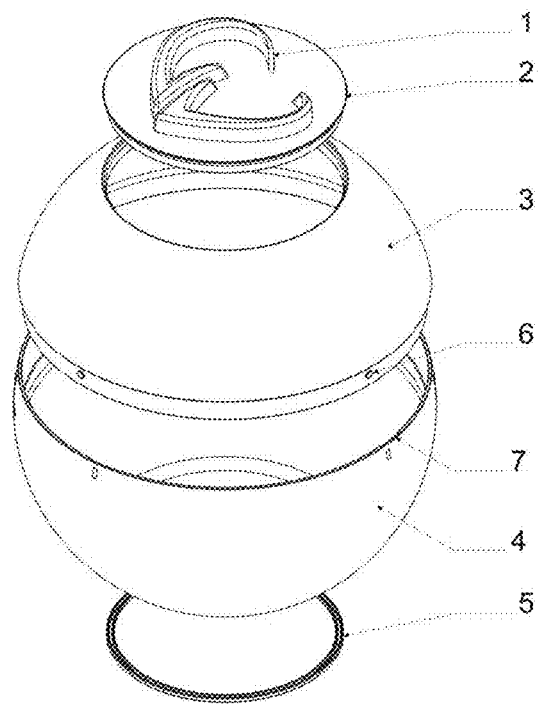
FIG. 3—Represents an exploded perspective view of the bowl assembly.
Figure 4:
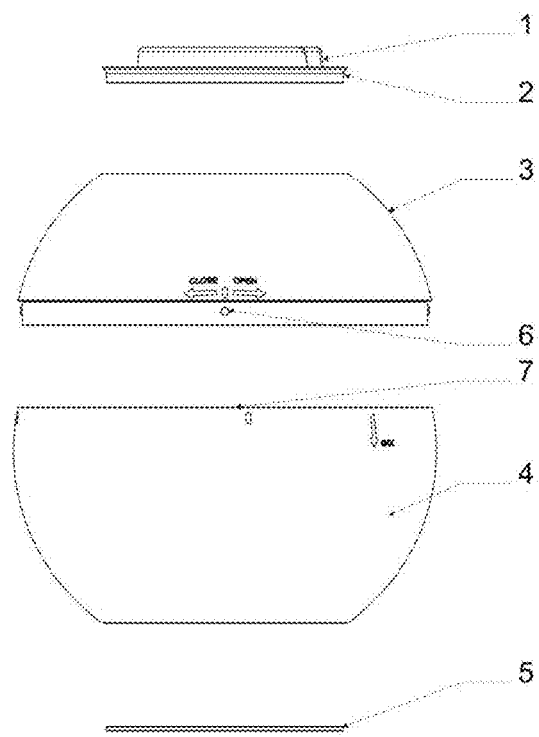
FIG. 4—Represents an exploded front view of the bowl assembly.

The drawing shows:
1. Lid gripping handle;
2. Plastic cover;
3. Median removable extension made of transparent plastic;
4. Opaque plastic bowl;
5. Silicone sealant;
6. Protrusions located on the outside of the lower edge of the median extension, positioned diametrically opposed and at equal distances between them; and
7. "L" shaped gripping grooves, profiled on the inside of the top edge of the main bowl, positioned diametrically opposed and at equal distances between them.

Below are the characteristics of the bowl assembly configuration:
D1=Bowl diameter (sphere diameter)
D2=Diameter at the joint between the bowl and the median removable extension
D3=Diameter of top lid and bowl base
H1=Total height of the bowl assembly (with the removable median extension attached) without the lid handle
H2=Height of lower bowl (base bowl)
H3=Height of the removable median extension+height of the lid without the lid handle
H1/D1=0.8–0.9
H2/H1=0.6–0.7
H3/H1=0.4–0.3

Mounting Example

The utility model comprises a spherical opaque plastic bowl (4) having a silicone sealant (5) applied to the bottom of the bowl to ensure the stability of the assembly during operation and which is provided at the top with four "L" shaped grooves, profiled on the inside of the top edge of the main bowl, positioned diametrically opposed and at equal distances between them (7), over which a removable median extension in the form of a spherical area open at its top and bottom (3) is attached, made of transparent plastic, which is provided with four protrusions diametrically opposed and at equal distances between them, located on the outside of the lower edge of the median extension (6). Above the removable extension a plastic lid (2) is positioned, which has a three-dimensional protruding grip profile (1) resulting from its configuration. The entire assembly is characterized by the ratio of the H1 height of the bowl assembly to the D1 diameter of the sphere of the bowl assembly, H1/D1 in the range 0.8-0.9, the ratio of the H2 height of the bowl (4) to the H1 height of the bowl assembly, H2/H1 in the range 0.6-0.7, and the ratio of the H3 height of the median extension (3) to the H1 height of the bowl assembly, H3/H1 in the range 0.4-0.3.

Figure 9:
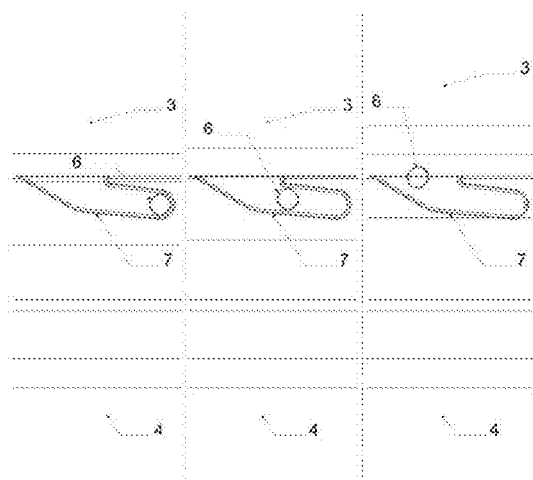
FIG. 9—Represents a detail of the closing system, viewed from the front, in three sliding positions of the protrusion in the groove.
Figure 10:
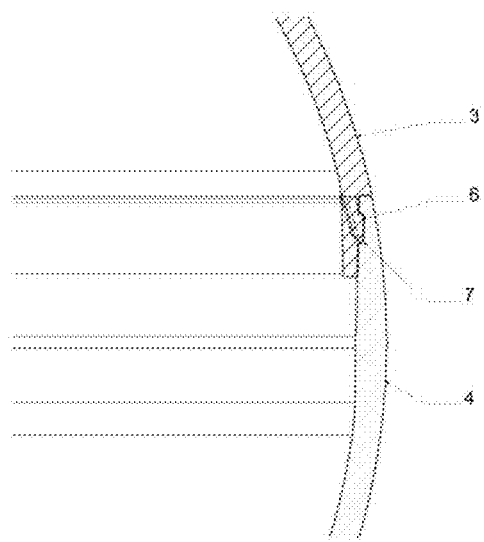
FIG. 10—Represents a detail of the closing system viewed in the section.
Figure 11:
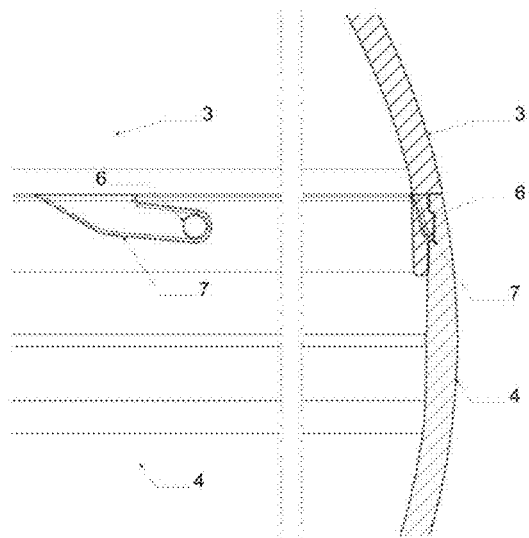
FIG. 11—Represents details of the closing system, viewed from the front and in the section.
Figure 12:
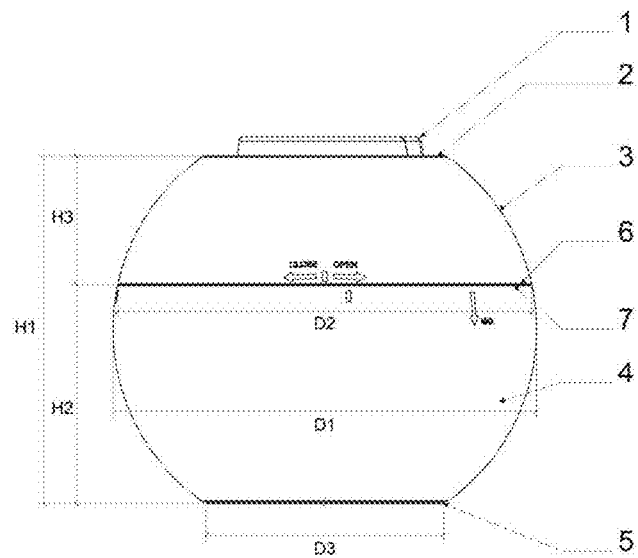
FIG. 12—Represents a figure with the dimensional characteristics of the assembled bowl assembly.
Figure 13:
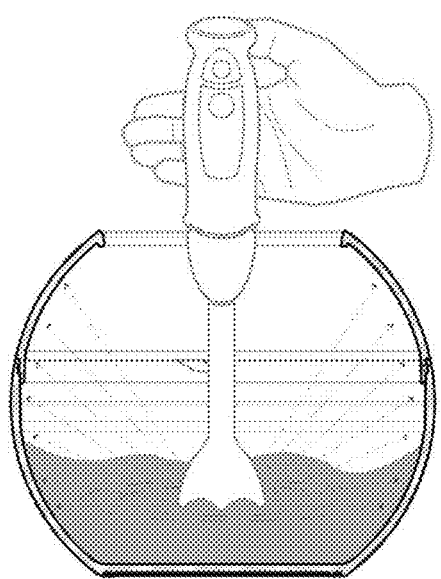
FIG. 13—Represents an example of use.

Closing between the parts of the bowl assembly is achieved by a known gripping system, by sliding four protrusions (6) positioned diametrically opposed and at equal distances between them, located on the outside of the lower edge of the median extension, in four "L" shaped grooves (7), profiled on the inside of the top edge of the main bowl, positioned diametrically opposed and at equal distances between them. The joining of the parts together to form the bowl assembly is illustrated in the details of FIGS. 9, 10, and 11.

Figure 5:
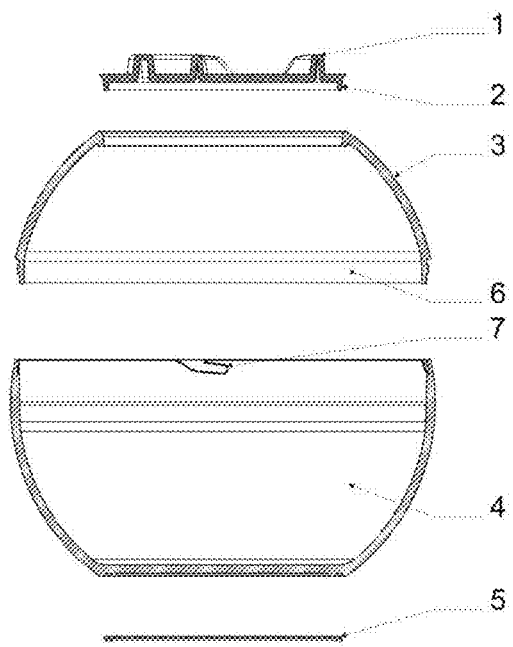
FIG. 5—Represents a cross section through the exploded bowl assembly.
Figure 6:
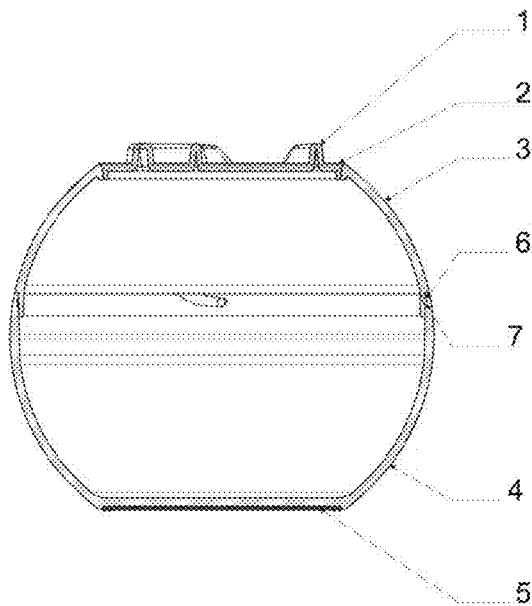
FIG. 6—Represents a cross-section through the assembled bowl assembly.
Figure 7:
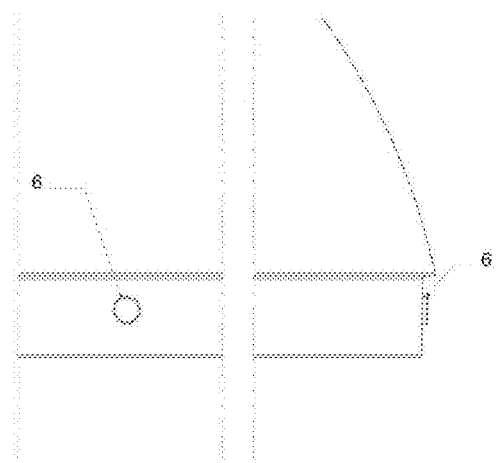
FIG. 7—Represents a detail of the protrusions located on the outside of the lower edge of the median extension, positioned diametrically opposed and at equal distances between them.
Figure 8:
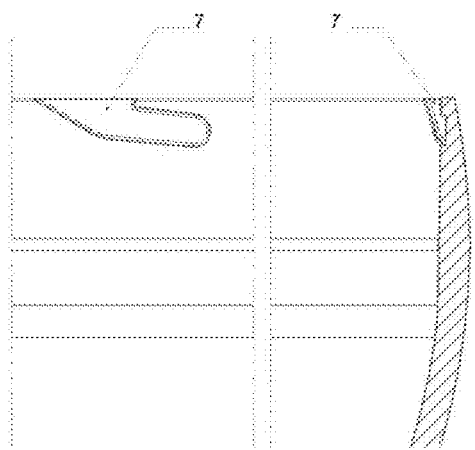
FIG. 8—Represents a detail of the "L" shaped gripping grooves, profiled on the inside of the top edge of the main bowl, positioned diametrically opposed and at equal distances between them.

In order to ensure an effective closure, as shown in FIG. 6, the upper edge—the "lip"—of the bowl (4) and the lower edge of the spherical median extension (3) have the special configurations shown in FIGS. 5, 7, and 8, forming a known gripping system. The top edge of the bowl (4) has four "L" shaped grooves (7) profiled on the inside, positioned diametrically opposed and at equal distances between them. The spherical median extension (3) has on the outside of its lower edge four rounded protrusions (6) positioned diametrically opposed and at equal distances between them. The diameter of the four protrusions (6) is smaller than the width of the grooves (7), and the joining of the spherical main bowl—the base of the assembly (4) and the spherical removable median extension (3) is achieved by sliding the four protrusions (6) into the four grooves (7) by a press-and-twist motion of the median extension (3) on the bowl (4).

In one embodiment, the various plastic elements could be made of a heat-resistant plastic. Similarly, in one embodiment, the silicone sealant could be a heat-resistant sealant.

The invention claimed is:

1. A bowl assembly comprising a main bowl, a removable median extension, and a lid,
wherein the main bowl is made of an opaque plastic material and has a spherical zone having a silicone sealant applied to a bottom of the main bowl to ensure stability of the bowl assembly during use and the main bowl is provided at a top with four "L" shaped grooves, profiled on an inside of a top edge of the main bowl, positioned diametrically opposed and at equal distances from each other, over which the removable median extension having a spherical area open at a top and a bottom thereof is attached, the removable median extension being made of transparent plastic, and which is provided with four protrusions diametrically opposed and at equal distances from each other, located on an outside of a lower edge of the removable median extension and which is joined with the main bowl by sliding said protrusions on the grooves, and above the removable median extension there being positioned the lid made of plastic, which has a grip profile and wherein:
a ratio of a height H1 of the bowl assembly to a sphere diameter D1 of the bowl assembly, H1/D1 is in the range of 0.8-0.9,
a ratio of the height H2 of the main bowl to the height H1 of the bowl assembly, H2/H1 is in the range of 0.6-0.7,
a ratio of a height of the removable median extension to the height H1 of the bowl assembly, H3/H1 is in the range of 0.4-0.3, and
a base diameter of the bottom of the main bowl is equal to a diameter of an upper aperture of the top of the removable median extension.

2. A bowl assembly comprising:
a main bowl having a spherical outer surface;
a removable median extension having a spherical outer surface; and
a lid having a protruding grip profile,
wherein an axial height of the removable median extension is greater than an axial height of the lid and less than an axial height of the main bowl,
wherein the main bowl is made of an opaque plastic material having a spherical zone with a silicone sealant applied to a bottom of the main bowl to ensure stability of the bowl assembly during use and the main bowl is provided at a top with four "L" shaped grooves, profiled on an inside of a top edge of the main bowl, positioned diametrically opposed and at equal distances from each other, over which the removable median extension having a spherical area open at a top and a bottom thereof is attached, the removable median extension being made of transparent plastic, and is provided with four protrusions diametrically opposed and at equal distances from each other, located on an outside of a lower edge of the removable median extension and which is joined with the main bowl by sliding the protrusions on said grooves, and above the removable median extension there is positioned the lid made of plastic, which has the protruding grip profile, and
wherein:
a ratio of a height H1 of the bowl assembly to a sphere diameter D1 of the bowl assembly, H1/D1 is in the range of 0.8-0.9,
a ratio of the height H2 of the main bowl to the height H1 of the bowl assembly, H2/H1 is in the range of 0.6-0.7,
a ratio of a height of the removable median extension to the height H1 of the bowl assembly, H3/H1 is in the range of 0.4-0.3, and
a base diameter of the bottom of the main bowl is equal to a diameter of an upper aperture of the top of the removable median extension.

3. A bowl assembly comprising:
a main bowl having a spherical outer surface and a planar bottom;
a removable median extension having a spherical outer surface; and
a lid having a three-dimensional protruding grip profile,
wherein an axial height of the removable median extension is greater than an axial height of the lid and less than an axial height of the main bowl,
wherein the main bowl is made of an opaque plastic material having a spherical zone with a silicone sealant applied to the planar bottom of the main bowl to ensure stability of the bowl assembly during use and the main bowl is provided at a top with four "L" shaped grooves, profiled on an inside of a top edge of the main bowl, positioned diametrically opposed and at equal distances from each other, over which the removable median extension having a spherical area open at a top and a bottom thereof is attached, the removable median extension being made of transparent plastic, which is provided with four protrusions diametrically opposed and at equal distances from each other, located on an outside of a lower edge of the removable median extension and which is joined with the main bowl by sliding the protrusions on said grooves, and above the removable median extension there is positioned the lid made of plastic, which has the three-dimensional protruding grip profile, and
wherein:
a ratio of a height H1 of the bowl assembly to a sphere diameter D1 of the bowl assembly, H1/D1 is in the range of 0.8-0.9,
a ratio of the height H2 of the main bowl to the height H1 of the bowl assembly, H2/H1 is in the range of 0.6-0.7, and
a ratio of a height of the removable median extension to the height H1 of the bowl assembly, H3/H1 is in the range of 0.4-0.3.

4. The bowl assembly of claim 3, wherein a base diameter of the planar bottom of the main bowl is equal to a diameter of an upper aperture of the top of the removable median extension.

* * * * *